(12) United States Patent
Benecke

(10) Patent No.: US 9,379,651 B2
(45) Date of Patent: Jun. 28, 2016

(54) METHOD AND ASSEMBLY FOR OPERATING SYNCHRONOUS MOTORS

(71) Applicant: Siemens Aktiengesellschaft, Munich (DE)

(72) Inventor: Marcel Benecke, Magdeburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 28 days.

(21) Appl. No.: 14/355,403

(22) PCT Filed: Nov. 2, 2012

(86) PCT No.: PCT/EP2012/071693
§ 371 (c)(1),
(2) Date: Apr. 30, 2014

(87) PCT Pub. No.: WO2013/068301
PCT Pub. Date: May 16, 2013

(65) Prior Publication Data
US 2014/0312814 A1    Oct. 23, 2014

(30) Foreign Application Priority Data
Nov. 7, 2011   (DE) .......................... 10 2011 085 853

(51) Int. Cl.
*H02P 6/06* (2006.01)
*H02P 6/20* (2016.01)
(Continued)

(52) U.S. Cl.
CPC .. *H02P 6/20* (2013.01); *H02P 1/46* (2013.01); *H02P 6/001* (2013.01); *H02P 6/22* (2013.01); *H02P 27/16* (2013.01)

(58) Field of Classification Search
CPC ...... H02P 21/06; H02P 21/0089; H02P 27/04; H02P 21/0035; H02P 27/08; H02P 21/14; H02P 21/0021; H02P 21/02; H02P 21/10; H02P 23/0095; H02P 23/14; H02P 25/023; H02P 6/08; H02P 6/16; H02P 1/46
USPC ............ 318/254, 432, 400.34, 721.723, 802, 318/806, 807, 400.03
See application file for complete search history.

(56) References Cited

U.S. PATENT DOCUMENTS 4,364,004 A * 12/1982 Bourbeau ..................... 318/721
4,443,747 A *  4/1984 Chausse et al. ............... 318/723
(Continued)

FOREIGN PATENT DOCUMENTS

DE     102010008814 A1    8/2011

OTHER PUBLICATIONS

German Office Action for German Application 10 2011 085 853.9 dated Apr. 24, 2012.
(Continued)

*Primary Examiner* — Paul Ip
(74) *Attorney, Agent, or Firm* — Harness, Dickey & Pierce, P.L.C.

(57) ABSTRACT

A method is disclosed for operating a synchronous machine by way of a three-phase AC power controller, which is connected to a three-phase network. The embodiment of the method includes determining the phase difference between the magnet-wheel voltage of the synchronous machine and the network voltage of the three-phase network; determining the rotational speed of the rotor of the synchronous machine; determining the phase position of the three-phase network; determining a decision characteristic number on the basis of a stored data table calculated in advance, which data table associates a decision characteristic number with value triples of phase difference, phase position, and rotational speed; and determining at least one switching time point on the basis of the decision characteristic number.

10 Claims, 3 Drawing Sheets

(51) Int. Cl.
*H02P 6/22* (2006.01)
*H02P 27/16* (2006.01)
*H02P 1/46* (2006.01)
*H02P 6/00* (2016.01)

(56) References Cited

U.S. PATENT DOCUMENTS

| | | | | |
|---|---|---|---|---|
| 4,565,957 A * | 1/1986 | Gary et al. | | 318/723 |
| 4,857,819 A * | 8/1989 | Maurice | | H02P 1/30 |
| | | | | 318/778 |
| 5,187,419 A * | 2/1993 | DeLange | | 318/805 |
| 5,272,429 A * | 12/1993 | Lipo et al. | | 318/808 |
| 6,236,179 B1 * | 5/2001 | Lawler | | B60L 11/1807 |
| | | | | 318/375 |
| 6,362,586 B1 * | 3/2002 | Naidu | | 318/432 |
| 7,245,449 B2 * | 7/2007 | Stein et al. | | 360/65 |
| 7,294,988 B2 * | 11/2007 | Ajima et al. | | 318/712 |
| 7,531,976 B2 * | 5/2009 | Fukamizu et al. | | 318/400.34 |
| 7,696,715 B2 * | 4/2010 | Fisher et al. | | 318/802 |
| 8,169,181 B2 * | 5/2012 | Ranganathan | | H02K 17/28 |
| | | | | 318/727 |
| 8,179,068 B2 * | 5/2012 | Yuuki et al. | | 318/432 |
| 8,410,733 B2 * | 4/2013 | Ranganathan | | H02P 4/00 |
| | | | | 318/400.01 |
| 8,421,398 B2 * | 4/2013 | Fisher et al. | | 318/806 |
| 8,552,678 B2 * | 10/2013 | Yuuki et al. | | 318/718 |
| 2002/0070715 A1 * | 6/2002 | Sasaki et al. | | 322/28 |
| 2006/0087265 A1 * | 4/2006 | Furem | | 318/105 |
| 2006/0087278 A1 * | 4/2006 | Furem | | 318/778 |
| 2006/0125439 A1 * | 6/2006 | Ajima et al. | | 318/716 |
| 2006/0267527 A1 * | 11/2006 | Khopkar | | H02P 6/00 |
| | | | | 318/400.01 |
| 2007/0046247 A1 * | 3/2007 | Barie et al. | | 318/799 |
| 2007/0194730 A1 * | 8/2007 | Fukamizu et al. | | 318/254 |
| 2007/0273323 A1 * | 11/2007 | Acquaviva | | H02P 1/46 |
| | | | | 318/720 |
| 2008/0001571 A1 * | 1/2008 | Tomigashi | | 318/721 |
| 2008/0074076 A1 * | 3/2008 | Fisher | | H02P 27/04 |
| | | | | 318/802 |
| 2008/0203962 A1 * | 8/2008 | Maeda et al. | | 318/721 |
| 2008/0218111 A1 * | 9/2008 | Okamura | | 318/453 |
| 2010/0123418 A1 * | 5/2010 | Itoh et al. | | 318/400.02 |
| 2010/0148719 A1 * | 6/2010 | Fisher | | H02P 27/04 |
| | | | | 318/806 |
| 2010/0176757 A1 * | 7/2010 | Yamakawa et al. | | 318/400.09 |
| 2010/0185350 A1 * | 7/2010 | Okamura et al. | | 701/22 |
| 2010/0253254 A1 * | 10/2010 | Ranganathan | | H02P 4/00 |
| | | | | 318/400.09 |
| 2011/0018485 A1 * | 1/2011 | Maeda et al. | | 318/721 |
| 2011/0050157 A1 * | 3/2011 | Ranganathan | | H02K 17/28 |
| | | | | 318/818 |
| 2011/0115420 A1 * | 5/2011 | Yamada | | 318/400.09 |
| 2011/0187308 A1 * | 8/2011 | Suhama et al. | | 318/798 |
| 2011/0193509 A1 * | 8/2011 | Ooyama | | H02M 1/12 |
| | | | | 318/503 |
| 2011/0219208 A1 * | 9/2011 | Asaad et al. | | 712/12 |
| 2011/0241583 A1 * | 10/2011 | He et al. | | 318/400.09 |
| 2011/0248663 A1 * | 10/2011 | Yamakawa et al. | | 318/805 |
| 2011/0266992 A1 * | 11/2011 | Nishiguchi et al. | | 318/807 |
| 2012/0032620 A1 * | 2/2012 | Shimada et al. | | 318/400.09 |
| 2012/0169267 A1 * | 7/2012 | Nashiki et al. | | 318/701 |
| 2012/0313566 A1 | 12/2012 | Benecke | | |
| 2013/0069568 A1 * | 3/2013 | Krefta et al. | | 318/400.02 |
| 2013/0106326 A1 * | 5/2013 | Kamatani et al. | | 318/400.06 |
| 2013/0214709 A1 * | 8/2013 | Omata et al. | | 318/400.02 |
| 2013/0214710 A1 * | 8/2013 | Omata et al. | | 318/400.02 |
| 2013/0214711 A1 * | 8/2013 | Omata et al. | | 318/400.02 |
| 2013/0334991 A1 * | 12/2013 | Yuuki et al. | | 318/400.02 |

OTHER PUBLICATIONS

International Search Report PCT/ISA/210 for International Application No. PCT/EP2012/071693 Dated Sep. 24, 2013.
Written Opinion of the International Searching Authority PCT/ISA/237 for International Application No. PCT/EP2012/071693 dated Sep. 24, 2013.

* cited by examiner

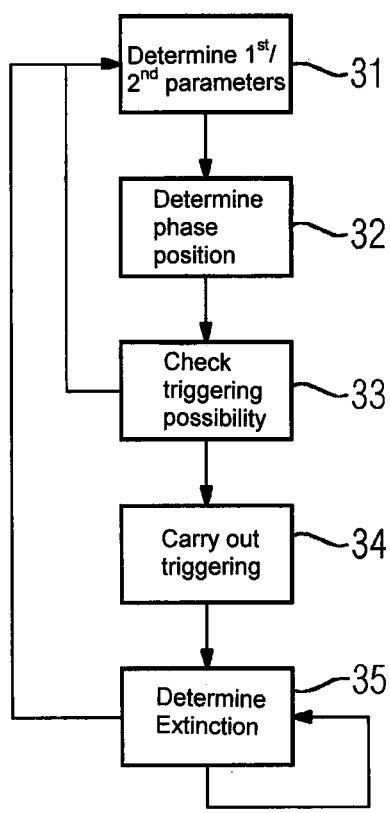

METHOD AND ASSEMBLY FOR OPERATING SYNCHRONOUS MOTORS

PRIORITY STATEMENT

This application is the national phase under 35 U.S.C. §371 of PCT International Application No. PCT/EP2012/071693 which has an International filing date of Nov. 2, 2012, which designated the United States of America, and which claims priority to German patent application number DE 102011085853.9 filed Nov. 7, 2011, the entire contents of each of which are hereby incorporated herein by reference.

FIELD

At least one embodiment of the invention generally relates to a device for operating synchronous motors and/or an associated method for operating synchronous motors by way of three-phase power controllers which are connected to a three-phase network and which comprise at least two semiconductor controllers, for example thyristors connected in antiparallel. At least one embodiment deals in particular with the start-up of the synchronous motor.

BACKGROUND

Three-phase synchronous motors not having a starting cage are tied to the frequency of the three-phase supply network on account of their principle of operation. A start-up, in other words powering up such motors is therefore not possible directly on the network. Rather, a device which enables powering up in the first place is necessary between the three-phase network and the synchronous machine. To this end, a frequency converter is normally used. The frequency converter includes a rectifier, an intermediate circuit capacitor and an inverter. It is used in order to generate a three-phase current having a selectable frequency.

SUMMARY

At least one embodiment of the invention is directed to a method and/or an assembly by which the operation of a synchronous machine on a three-phase network is enabled with minimal requirements in terms of power electronics components. In an embodiment, the start-up of the synchronous machine should in particular be enabled.

At least one embodiment is directed to a method. At least one embodiment is directed to an assembly. Developments of the invention are set down in the dependent claims.

With regard to the method according to at least one embodiment of the invention for operating a synchronous machine by way of a three-phase power controller which is connected to a three-phase network, at least the following steps are executed. A determination is carried out of a first parameter in the form of a phase difference between magnet-wheel voltage of the synchronous machine and network voltage of the three-phase network. This can be effected for example through measurement of the three-phase network voltage and magnet-wheel voltage and corresponding comparison. Furthermore, a determination is carried out of the rotational speed of the rotor of the synchronous machine as a second parameter. The phase position of the three-phase network is determined as a third parameter. In other words, this involves ascertaining how far the current point in time is removed from the most recent zero crossing of a voltage.

On the basis of the three parameters, a decision characteristic number is determined with the help of a stored data table which has been calculated in advance. In this situation the data table associates a decision characteristic number with value triples including phase difference, phase position and rotational speed. On the basis of the decision characteristic number at least one switching time point is determined at which the semiconductor controllers are activated.

This means that the situation is advantageously achieved that switching on of the semiconductor controllers is performed only at such switching point times at which a positive torque is expected. Positive torque in this situation is understood to be a torque which acts only in one of the two possible directions for a power-up procedure. In other words, only accelerating torque is generated while braking torque is avoided. In this situation however the use of a frequency converter is not necessary but merely one power controller is employed.

In this situation, according to an advantageous embodiment of the invention, the decision characteristic number is used as the basis for ascertaining whether the present point in time is employed as a switching time point. In other words, on the basis of the ascertained parameters a decision is always taken for the current point in time, in other words now, as to whether the semiconductor controllers are activated. The method is then expediently executed regularly at as short intervals in time as possible.

In a further embodiment of the invention, it is ascertained whether the switches of the power controllers are switched off, and only in this case is the present point in time possibly employed as a switching time point. In other words, switching on of the semiconductor controllers only then comes into consideration if the semiconductor controllers are currently switched off. This procedure is advantageous because the data table is created on the prerequisite that no currents are flowing. If the semiconductor controllers are activated, then current is however flowing and the data table provides an incorrect decision characteristic number for the current point in time.

In an advantageous embodiment and development of an embodiment of the invention, the decision characteristic number is compared with a definable threshold value in order to ascertain a switching time point. Alternatively, the decision characteristic numbers can also be stored in the form of truth values, which renders a comparison with a numerical value superfluous.

By preference, the decision characteristic numbers of the data table are calculated from a torque curve resulting for the synchronous machine, which torque curve results on activation of the semiconductor controllers for value triples including phase difference, phase position and rotational speed. If thyristors are employed in the power controllers, then after triggering of the thyristors takes place this results in an automatic switch-off again and thus always a finite activation time for which the torque curve can be calculated.

The decision characteristic numbers of the data table can in this situation for example take into consideration a maximum current occurring which results on activation of the power controllers for value triples including phase difference, phase position and rotational speed. Alternatively or additionally, it is possible to take into consideration both a mean torque over the activation time and also the effective torque over the activation time.

The assembly according to an embodiment of the invention for operating a synchronous machine is designed in order to execute an embodiment of the described method, for example. It comprises a three-phase power controller which can be connected to a three-phase network and comprises at least two semiconductor controllers for the phases of the three-phase network. The assembly furthermore comprises:
- a device for determining the phase difference between magnet-wheel voltage of the synchronous machine and network voltage of the three-phase network,
- a device for determining the rotational speed of the rotor of the synchronous machine,
- a device for determining the phase position of the three-phase network,
- a storage device and a data table stored in the storage device which associates a decision characteristic number with values for the phase difference, phase position and rotational speed, and also
- a control facility designed in order to ascertain from the ascertained values for phase difference, phase position and rotational speed the decision characteristic number and from the decision characteristic number to ascertain at least one switching time point at which the semiconductor controllers are activated.

The power controller comprises at least two semiconductor controllers, expediently three semiconductor controllers, one per phase. The semiconductor switching elements in question can for example be AC power controllers. The AC power controllers can for example be implemented as pairs of thyristors connected in antiparallel or as triacs. IGBTs or other types of semiconductor switches could however also be used. The power controller is connected to a three-phase network. The stator winding of the synchronous motor is in this situation preferably connected in star fashion without a neutral conductor. The AC power controllers are activated or triggered, in other words switched to conducting or prepared for conduction, at certain points in time.

By preference, the assembly comprises a device for ascertaining whether all the semiconductor switching elements are switched off or, in the case of thyristors, extinguished. For example, a device for current measurement can be employed for this purpose.

The device in question for determining the rotational speed of the rotor of the synchronous machine can for example be a device for determining the mechanical position angle of the rotor. The mechanical position angle expediently specifies the position of the rotor in relation to a definable spatially fixed position. The position angle extends in this case expediently from 0° to 360°. The rotational speed is concluded from the change over time in the position angle. Other measurements of the rotational speed are also possible.

The phase position of the three-phase network in at least one of the phases of the stator winding is furthermore ascertained. It is also possible to use different measuring methods in this case. For the described method and the device it is necessary to ascertain the elapsed time since the most recent zero crossing of the voltage of a phase. Said elapsed time can be represented, ascertained and used as an angle or as time or in a different manner.

The described method is implemented, in particular, via software. With reference to the described device, this has in particular a control unit which is designed in order to implement the described procedure. It can therefore be implemented simply in existing power controllers without any additional requirement in terms of components. Acquisition of the rotor speed is necessary in this case. It is advantageous if a control unit, which is expediently implemented today as a microprocessor provided in the synchronous machine, assumes control of the power controller. In this case, data from for example a position encoder integrated in the synchronous machine is already automatically available. Furthermore, such a synchronous machine can already include the power controller, in other words be implemented as a complete unit which can thus be connected directly to a three-phase network.

BRIEF DESCRIPTION OF THE DRAWINGS

A preferred but not in any way restrictive example embodiment of the invention will now be described in detail with reference to the drawing. In this situation the features are illustrated schematically and corresponding features are identified by the same reference characters. The figures show this in detail:

FIG. 4 shows a flowchart for the control of the synchronous machine.

DETAILED DESCRIPTION OF THE EXAMPLE EMBODIMENTS

Figure 1:
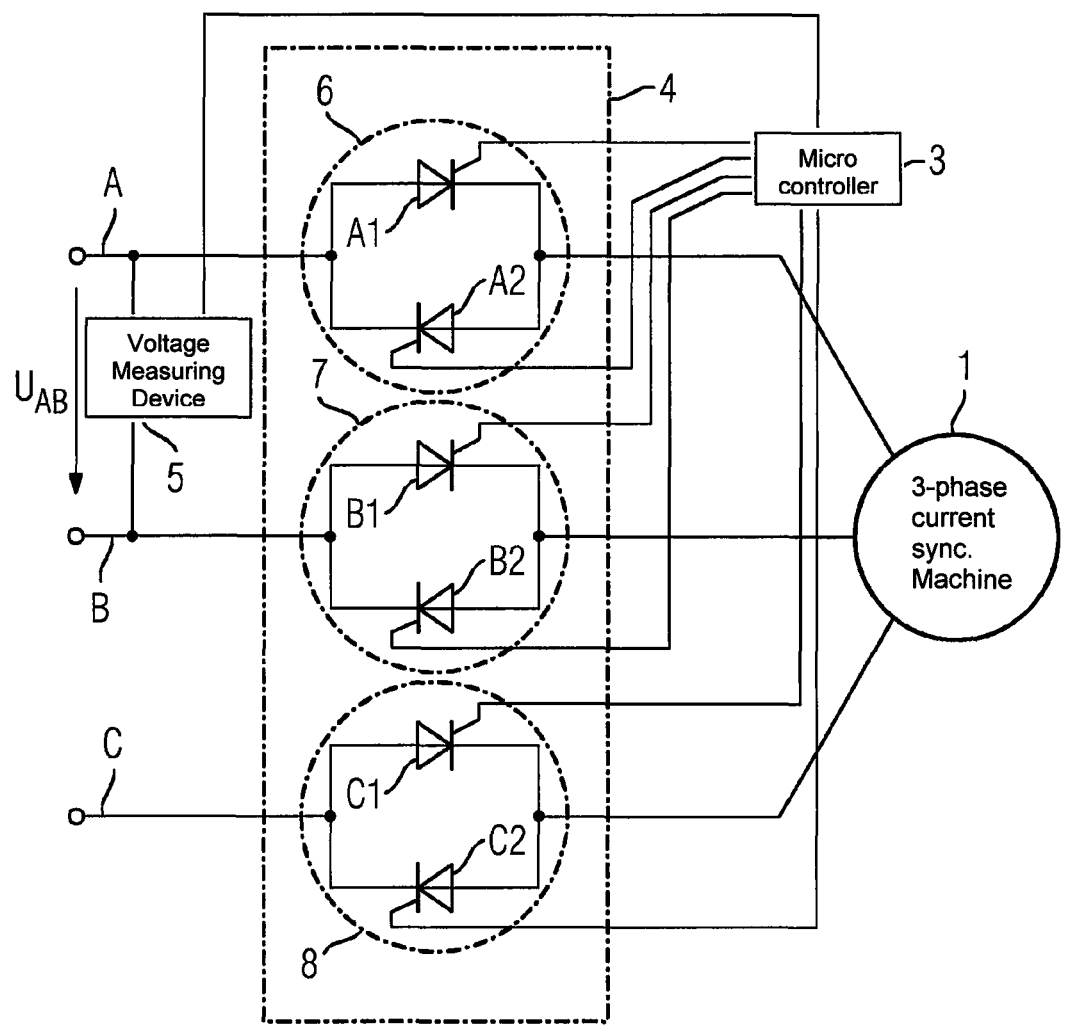
FIG. 1 shows an equivalent circuit diagram of a power controller with a synchronous machine connected.

In FIG. 1, a three-phase current synchronous machine 1 is connected by way of a three-phase power controller 4 to the phases A, B, C of a three-phase network. Each of the phases A, B, C is assigned a semiconductor controller 6, 7, 8 including two thyristors A1, A2, B1, B2, C1, C2 connected in antiparallel. The trigger electrodes of the thyristors A1, A2, B1, B2, C1, C2 are connected to a control device 3 by which the trigger signals required in order to trigger the thyristors A1, A2, B1, B2, C1, C2 are made available. The control device 3 also controls the phase cutting angle. The control device 3 is implemented by way of a microcontroller. A voltage measuring device 5 is connected between two phases A, B, C of the network, for example between the terminals A and B of the network in FIG. 1, at the output of which voltage measuring device 5 the network voltage UAB occurring between said two terminals A and B is available. Further voltage measuring devices, not shown, can likewise be present for the other two phase pairs.

In an embodiment variant the control device 3 and the power controller 4 are a unit separate from the three-phase current synchronous machine 1, in other words implemented as a separate motor control device. In a second embodiment variant the control device 3 and the power controller 4 are part of the three-phase current synchronous machine 1. In this case, the functions of the control device 3 are expediently integrated into a microprocessor already present in the three-phase current synchronous machine 1. In the present exemplary embodiment the control device 3 is used for processing a suitable program by which the operation of the device can take place via software.

In order to accelerate the synchronous machine from a standstill an accelerating torque is required. To this end it is necessary to supply the stator winding with current in such a manner that positive torque (internal torque) is produced which both effects an acceleration of the machine and also compensates for the counter torque of the load. According to the equation 1 the internal torque is also dependent on the rotor position in addition to the currents.

$$m_i = \frac{3}{2} p \cdot \psi_p \cdot \left( i_{1A} \cdot (-\sin\vartheta_R) + (i_{1B} - i_{1C}) \cdot \cos\vartheta_R \cdot \frac{1}{\sqrt{3}} \right)$$

where $m_i$ is the internal torque, p the pole pair number, $i_n$ stator currents, $\vartheta_R$, the magnet-wheel angle electrical, and $\psi_P$ the magnetic flux linkage.

In order to generate at a certain point in time through triggering of the thyristors A1, A2, B1, B2, C1, C2 currents which deliver a favorable torque curve, current and torque are calculated in advance for the synchronous machine 1 having known machine parameters for certain parameter constellations, namely rotational speed and phase position of the network voltage and of the voltage induced by the rotor. The parameter constellations ascertained for favorable torque serve as the basis for the definition of the trigger conditions.

Figure 2:
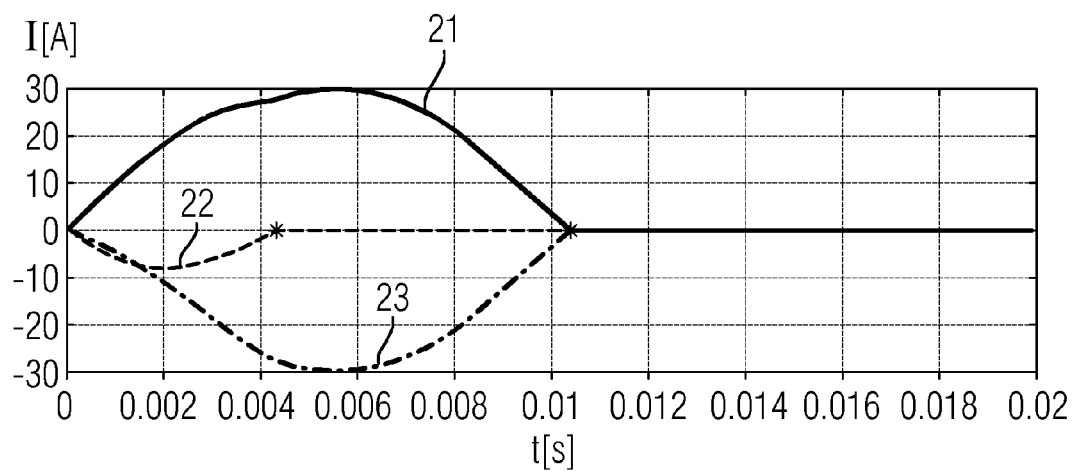
FIGS. 2 and 3 show diagrams illustrating the trigger time points.
Figure 3:
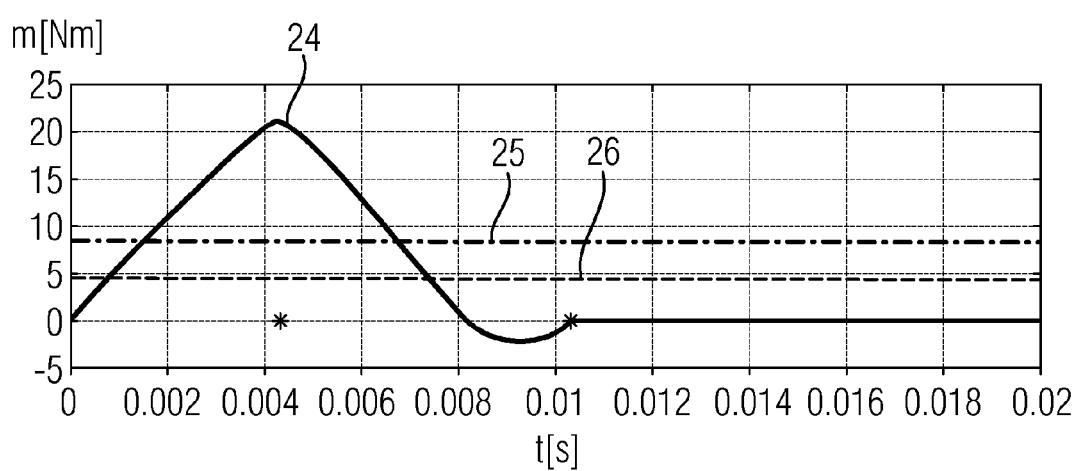

The triggering and the advance calculation thereof always take place in three-phase fashion. After a certain time one thyristor A1, A2, B1, B2, C1, C2 extinguishes and subsequently each of the further two thyristors A1, A2, B1, B2, C1, C2. FIGS. 2 and 3 show an example of the curves for the phase currents 21, 22, 23 and the torque 24 after triggering of the thyristors A1, A2, B1, B2, C1, C2 at point in time t=0. In this situation, an effective torque 25 and an arithmetic mean value for the torque 26 result for the curve shown. The latter two values apply to the entire curve shown for the torque 24 and are therefore only a number in each case and are independent of the elapsing time.

After the thyristors A1, A2, B1, B2, C1, C2 have extinguished a renewed triggering can take place. The calculation of the currents and the torque takes place numerically on the assumption of an infinite mass inertia of the system during the entire period of current conduction. It is thus possible to directly utilize universally valid solutions for differential equations defined for the currents, into which the machine parameters and also the potential trigger parameters must be inserted in each case. The potential trigger parameters are the switch-on point in time relative to the network voltage zero crossing and the difference angle between the space vectors of the network voltage and the magnet-wheel voltage (in the no-current state) with regard to the current rotational speed. Depending on said parameters, currents and generated torque and also the arithmetic mean value thereof are calculated. Using said data, a torque map is created and stored through parameter variation.

In addition, in the present example the evaluation of the torque values is effected by way of an evaluation function:

$$g = \frac{1}{2} \cdot \frac{\overline{m}}{\overline{m}_{max}} + \frac{1}{2} \cdot \frac{\overline{m}}{m_{eff}}$$

where $\overline{m}$ is the arithmetic mean of the torque up to when all the thyristors A1, A2, B1, B2, C1, C2 are extinguished, $\overline{m}_{max}$ the maximum of the torques thus ascertained in the entire map for a rotational speed, and $m_{eff}$ the effective torque.

In addition, the maximum current flowing is ascertained and compared with a defined permissible maximum current. The result of the parameter variation is masked by way of the torque evaluation function and by way of the current maximum examination. This means that trigger parameters for favorable torque curves are filtered out. The torque maps or the evaluation thereof are stored in a so-called look-up table (LUT) in the control device 3.

After calculation, an association of evaluated torque curves to be expected for a defined number of possible trigger time points is thereby available and triggering of the thyristors A1, A2, B1, B2, C1, C2 can be performed in accordance with the acquired parameters. In this situation the following cycle shown in FIG. 4 is executed:

In a first step 31, network voltage, magnet-wheel voltage and rotational speed are measured. In a second step 32, the parameters for the position are determined therefrom in the look-up table. These are the relative phase position from magnet-wheel voltage to network voltage, the time elapsed since the last zero crossing of one of the network voltages and the rotational speed itself.

In a third step 33, the checking of the triggering possibility according to LUT takes place. If a good point in time for the triggering is given, the sequence advances to the fourth step 34; otherwise it returns to the first step 31. In the fourth step 34, the three-phase triggering is carried out.

Then in a fifth step 35 the sequence waits for all the thyristors A1, A2, B1, B2, C1, C2 to extinguish. When extinction has been determined, then the sequence returns to the first step 31 for a new cycle.

For the checking of the triggering possibility according to LUT the result value from the look-up table is compared with a threshold value. If the threshold value is exceeded, then the thyristors A1, A2, B1, B2, C1, C2 can be triggered. In this situation the first three sequence steps are repeated in the present example at a frequency of approx. 1 ms. The actual frequency depends on the capabilities of the hardware and the programming. If the thyristors A1, A2, B1, B2, C1, C2 have been triggered, a current measurement serves to ascertain when all the thyristors A1, A2, B1, B2, C1, C2 have extinguished again. Only then will a new trigger time point be sought.

The invention claimed is:

1. A method for operating a synchronous machine by way of a three-phase power controller connected to a three-phase power supply, the method comprising:
   providing a microcontroller having a processor, wherein the processor
   determines a phase difference between magnet-wheel voltage of the synchronous machine and a voltage of the three-phase power supply;
   determines a rotational speed of a rotor of the synchronous machine;
   determines a phase position of the three-phase power supply;
   ascertaining a decision characteristic number using a stored data table, calculated in advance, the stored data table associating a decision characteristic number with value triples including phase difference, phase position and rotational speed; and
   determines at least one switching time point on the basis of the determined decision characteristic number, wherein the power controller includes thyristors connected in anti-parallel and is activated at at least one determined switching time point, wherein the decision characteristic numbers of the data table are calculated from a torque curve resulting for the synchronous machine, the torque curve results on activation of the power controller for value triples including phase difference, phase position and rotational speed and wherein the decision characteristic numbers of the data table take into consideration both a mean torque over a definable period of time and also the effective torque over the period of time, which result on activation of the power controller for value triples including phase difference, phase position and rotational speed.

2. The method of claim 1, wherein the processor ascertains whether the present point in time is employed as a switching time point based on the determined decision characteristic number.

3. The method of claim 2, wherein the processor ascertains whether switches of the power controller are switched off, and employing a present point in time as at least one switching time point upon ascertaining that switches of the power controller are switched off.

4. The method of claim 2, wherein the processor compares the decision characteristic number with a definable threshold value to ascertain at least one switching time point.

5. The method of claim 2, wherein the processor ascertains the decision characteristic numbers of the data table from a torque curve resulting for the synchronous machine, the torque curve resulting from activation of the power controller for value triples including phase difference, phase position and rotational speed.

6. The method of claim 1, wherein the processor compares the decision characteristic number with a definable threshold value to ascertain at least one switching time point.

7. The method of claim 1, wherein the decision characteristic numbers of the data table take include a maximum current occurring which results on activation of the power controller for value triples including phase difference, phase position and rotational speed.

8. The method of claim 7, wherein the decision characteristic numbers of the data table take into consideration both a mean torque over a definable period of time and also the effective torque over the period of time, which result on activation of the power controller for value triples including phase difference, phase position and rotational speed.

9. An assembly for operating a synchronous machine, comprising
a three-phase power controller, connectable to a three-phase power supply and including three semiconductor controllers for phases of the three-phase power supply, each of the semiconductor controllers having two thyristors connected in anti-parallel;
a microcontroller configured to
determine a phase difference between magnet-wheel voltage of the synchronous machine and a voltage of the three-phase power supply;
determine rotational speed of a rotor of the synchronous machine;
determine a phase position of the three-phase power supply; and
a storage device including a data table that associates a decision characteristic number with values for the phase difference, the phase position and the rotational speed, wherein the microcontroller is further configured to ascertain, from the values for the phase difference, the phase position and the rotational speed, the decision characteristic number and, from the decision characteristic number, ascertain at least one switching time point at which the semiconductor controllers are activated, wherein the decision characteristic numbers of the data table are calculated from a torque curve resulting for the synchronous machine, the torque curve results on activation of the power controller for value triples including phase difference, phase position and rotational speed, wherein the decision characteristic numbers of the data table take into consideration both a mean torque over a definable period of time and also the effective torque over the period of time, which result on activation of the power controller for value triples including phase difference, phase position and rotational speed.

10. The assembly of claim 9, wherein the microcontroller is further configured to ascertain whether all the thyristors are extinguished.

* * * * *